United States Patent

Schley et al.

[11] Patent Number: 4,658,580
[45] Date of Patent: Apr. 21, 1987

[54] EXHAUST GAS LINE FOR A SUPERCHARGED, MULTI-CYLINDER PISTON INTERNAL COMBUSTION ENGINE

[75] Inventors: Friedrich Schley; Dieter Wünsche, both of Friedrichshafen; Gerhard Haussmann, Tettnang, all of Fed. Rep. of Germany

[73] Assignee: MTU-Motoren- Und Turbinen-Union Friedrichshafen GmbH, Fed. Rep. of Germany

[21] Appl. No.: 782,387

[22] Filed: Oct. 1, 1985

[30] Foreign Application Priority Data

Dec. 17, 1984 [DE] Fed. Rep. of Germany ....... 3445916

[51] Int. Cl.⁴ .............................................. F01N 7/00
[52] U.S. Cl. ........................................ 60/322; 60/323
[58] Field of Search .................................. 60/322, 323

[56] References Cited

U.S. PATENT DOCUMENTS 3,177,649 4/1965 Tromel ................... 60/323
3,541,785 11/1970 Wahnschaffe ........... 60/323
4,182,122 1/1980 Stratton ................. 60/323
4,205,527 6/1980 Rudert ................... 60/323

FOREIGN PATENT DOCUMENTS 2510655 2/1983 France ................... 60/322

Primary Examiner—Douglas Hart
Attorney, Agent, or Firm—Barnes & Thornburg

[57] ABSTRACT

A fastening arrangement of an inner pipe line arranged in a housing adapted to be closed off gas-tight and conducting the exhaust gases, which is easy to assemble and reliable in operation, is attained by plug-in connections. The ends of axially adjacent pipe sections of the inner pipe line are thereby centered in retaining rings. Each retaining ring includes two approximately radially projecting lugs, of which one is constructed as a fixed point and the other as a displaceable coupling.

18 Claims, 5 Drawing Figures

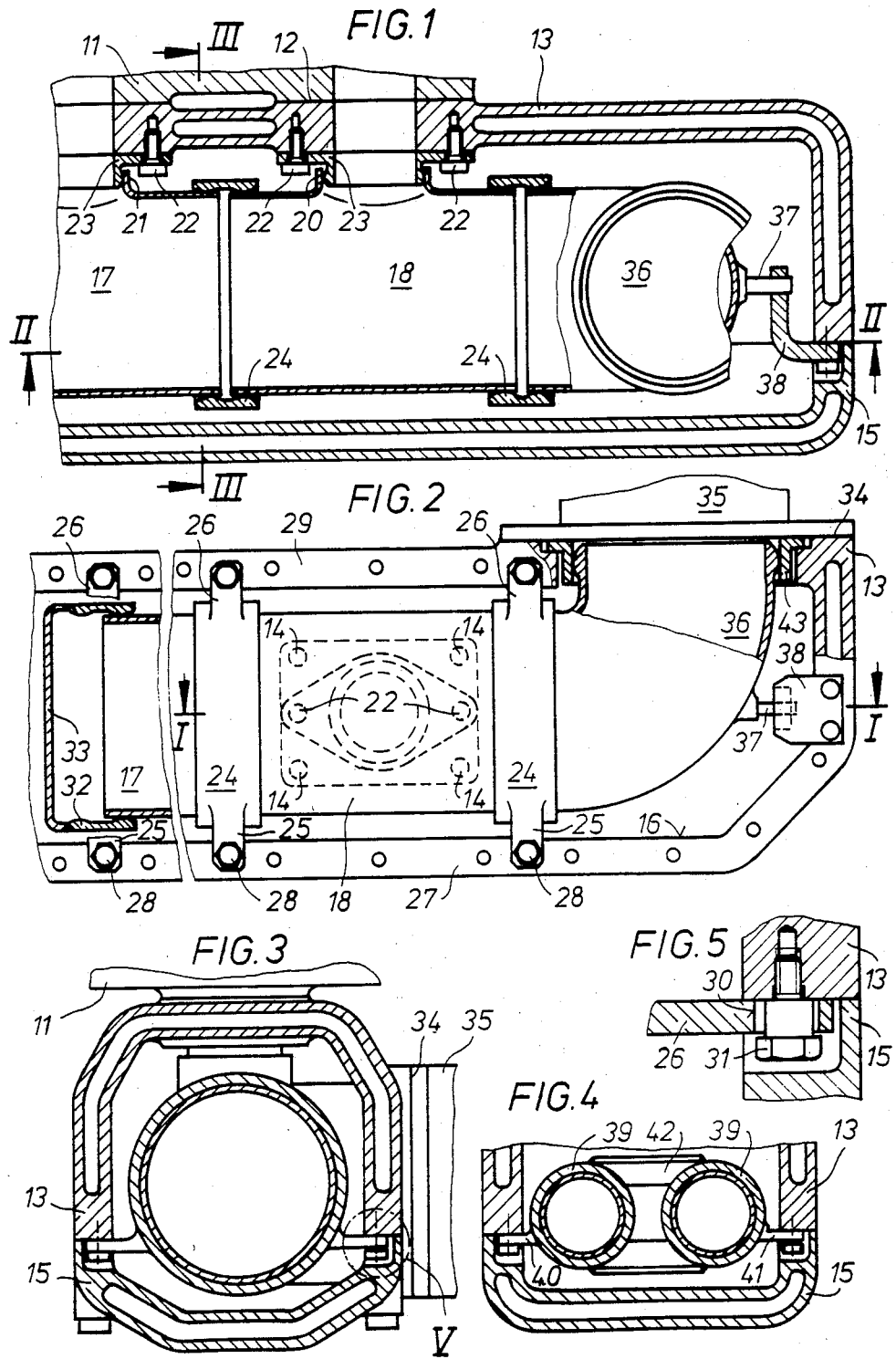

EXHAUST GAS LINE FOR A SUPERCHARGED, MULTI-CYLINDER PISTON INTERNAL COMBUSTION ENGINE

The present invention relates to a supercharged, multi-cylinder piston internal combustion engine with at least one inner pipe line conducting the exhaust gases and with a housing surrounding this pipe line with a spacing, and in which the housing is provided with an opening on the side opposite the piston internal combustion engine which extends approximately over the length of the pipe line and is adapted to be closed gas-tight with a cover, whereby the inner pipe line consists of individual pipe sections assembled by means of plug-in connections. The low surface temperatures which are required for the so-called non-monitored operation in ships, are not exceeded with piston internal combustion engines equipped with such exhaust gas lines.

An exhaust gas line of this type is disclosed in the DE-PS (German Patent) No. 26 53 263. The assembly and fastening of the inner pipe line has, however, proved unsatisfactory with this exhaust gas line.

It is therefore the object of the present invention to make the fastening of the inner pipe line more operationally reliable and more assembly-friendly.

The underlying problems are solved according to the present invention in that each pipe section of the inner pipe line includes an exhaust gas inlet connection which cooperates with a centering stub arranged in the housing interior at each exhaust gas flange, in that for each of the plug-in connections of two axially adjacent pipe sections a retaining ring is arranged receiving the pipe section ends which includes at its outer diameter oppositely disposed, approximately radially projecting lugs, and in that of each retaining ring one lug is fixed on the edge of the opening as fixed point and the other lug abutting at the oppositely disposed edge of the opening is constructed as loose point.

The advantages achieved with the present invention reside in particular in that a high operating safety and reliability of the exhaust gas line is achieved because each pipe section of the inner pipe line can expand freely during the operationally conditioned warm-up unimpeded by adjacent structural parts, in that a particularly simple assembly results for the inner pipe line, and more particularly with the arrangement of a single inner pipe line as also with several inner pipe lines extending adjacent one another, and in that for piston internal combustion engines of a model series having differing cylinder numbers, an economic manufacture of the exhaust gas line results from the large numbers of identical pipe sections of the inner pipe line.

These and other objects, features and advantages of the present invention will become more apparent from the following description when taken in connection with the accompanying drawing which shows, for purposes of illustration only, two embodiments in accordance with the present invention, and wherein:

FIG. 1 is a partial longitudinal cross sectional view through an exhaust gas line with a single inner pipe line according to the present invention, taken along line I—I in FIG. 2;

FIG. 2 is a longitudinal cross-sectional view of the exhaust gas line taken along line II—II in FIG. 1;

FIG. 3 is a cross-sectional view of the exhaust gas line taken along line III—III in FIG. 1;

FIG. 4 is a cross-sectional view of an exhaust gas line with two inner pipe lines disposed adjacent one another in accordance with the present invention; and FIG. 5 is a partial cross-sectional view illustrating a detail for the construction of the loose point lug according to the detail V in FIG. 3.

Referring now to the drawing wherein like reference numerals are used throughout the various views to designate like parts, a liquid-cooled housing 13 is threadably connected from the housing interior with the cylinder heads 11 of a piston internal combustion engine at exhaust gas flanges 12 by means of screws or bolts 22. The housing 13 is provided on the side opposite the piston internal combustion engine with an opening 16 extending approximately over the length of the housing 13 and adapted to be closed off gas-tight by means of a cover 15. A pipe line conducting the exhaust gases of the piston internal combustion engine is arranged on the inside of the housing 13, which consists of individual pipe sections 17, 18 assembled by means of plug-in connections. The length of the individual pipe sections 17, 18 corresponds approximately to the cylinder spacing of the piston internal combustion engine. Each pipe section 17, 18 of the inner pipe line includes an exhaust gas inlet connection 20, 21 which cooperates by way of a spherical ring bead with a centering stub 23 secured in the housing interior at each exhaust gas flange 12 by screws or bolts 22. Retaining rings 24 are provided for the plug-in connection of two ends of adjacent pipe sections 17 and 18. Each of the retaining rings 24 cooperates with the associated two pipe line ends by way of a spherical ring bead, whereby the ring beads may be arranged at the inner diameter of the retaining ring 24 or at the outer diameter of the pipe sections 17, 18. Each retaining ring 24 includes approximately radially projecting lugs 25 and 26 which are oppositely disposed at the outer diameter. Of each retaining ring 24, the one lug 25 is secured after assembly of the inner pipe line, as fixed point on the edge 27 of the opening 16 by bolts 28. The other lug 26 is constructed as loose point at the oppositely disposed edge 29 of the opening 16 whereby the lug 26 is displaceably guided on a bolt 31 secured on the edge 29 by means of an elongated aperture 30.

For closing off the one end of the inner pipe line, a cover 33 is arranged on the opening of the last retaining ring 32 receiving only one pipe section end.

A flange 34 for the fastening of the exhaust gas inlet of an exhaust gas turbocharger 35, not shown in detail, is arranged at one end of the housing 13. An exhaust elbow 36 is connected to the open end of the inner pipe line by a retaining ring 24 and represents the connection to the exhaust gas inlet of the exhaust gas turbocharger 35. A cylindrical stub 37 which extends in the axial direction of the inner pipe line, is arranged along the outer arc of the exhaust elbow 36. The cylindrical stub 37 cooperates with a support 38 also secured on the edge of the opening 16. The end of the exhaust elbow 36 facing the flange 34 is provided with a ring bead at the outer diameter, which cooperates with a radially displaceable centering ring 43.

With an arrangement of several inner pipe lines, for example, for the so-called ram-charging, the retaining rings 39 of the individual inner pipe sections are each arranged in one plane at the connecting places and are securely connected with each other by webs 42 (FIG. 4). Each connection of several retaining rings 39 also includes two approximately radially projecting lugs 40 and 41 which cooperate with the edges of the opening 16 of the housing 13. The lug 40 thereby forms the fixed point, and the lug 41 the loose point which can be constructed corresponding to FIG. 5.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An exhaust gas line for a supercharged, multi-cylinder piston internal combustion engine, comprising at least one inner pipe line conducting the exhaust gases, a housing means surrounding the pipe line with a spacing, said housing means being provided with an opening on the side opposite the piston internal combustion engine which extends approximately over its length and is adapted to be closed gas-tight by a cover, exhaust gas flanges at the piston internal combustion engine, the housing means being threadably connected with the exhaust gas flanges from the housing interior, the inner pipe line including individual pipe sections assembled by plug-in connecting means, each pipe section of the inner pipe line including individual pipe section of the inner pipe line including an exhaust gas inlet connection which cooperates with a centering stub arranged in the housing interior at each exhaust gas flange, the plug-in connecting means of two axially adjacent pipe sections each including a retaining ring means receiving the pipe section ends, the retaining ring means including at its outer diameter mutually oppositely disposed, approximately radially projecting lug means, one of said lug means being fixedly coupled to the edge of the opening and the other lug means which abuts at the opposite edge of the opening, being displaceably coupled to the edge of the opening.

2. An exhaust gas line according to claim 1, wherein each exhaust gas inlet connection cooperates with the associated centering stub under interposition of a spherical ring bead means.

3. An exhaust gas line according to claim 1, wherein each retaining ring means cooperates with the associated two pipe line ends under interposition of a spherical ring bead means.

4. An exhaust gas line according to claim 1, with several inner pipe lines, the retaining ring means of the inner pipe lines being arranged at each of the connecting places of the pipe sections substantially in a single plane and fixedly connected with each other.

5. An exhaust gas line according to claim 4, wherein each connection of several retaining ring means includes two lug means cooperating with the edge of the opening of the housing means.

6. An exhaust gas line according to claim 1, wherein for closing one end of the inner pipe line, a cover is arranged at the opening of the last retaining ring means.

7. An exhaust gas line according to claim 1, wherein the open end of the inner pipe line is connected with an exhaust elbow by a retaining ring means, the exhaust elbow including at its outer arc a cylindrical stub pointing substantially in the axial direction of the inner pipe line.

8. An exhaust gas line according to claim 7, wherein the exhaust elbow is supported at the cylindrical stub by a support means.

9. An exhaust gas line according to claim 7, wherein the exhaust elbow is being received at its end located in the flow direction by a radially moving centering ring means.

10. An exhaust gas line according to claim 5, wherein the lug means forming the loose point is provided within the area of its abutment at the edge of the opening of the housing means with an elongated aperture extending in the longitudinal direction, through which extends a bolt secured at the edge.

11. An exhaust gas line according to claim 2, wherein each retaining ring means cooperates with the associated two pipe line ends under interposition of a spherical ring bead means.

12. An exhaust gas line according to claim 11, wherein for closing one end of the inner pipe line, a cover is arranged at the opening of the last retaining ring means.

13. An exhaust gas line according to claim 12, wherein the open end of the inner pipe line is connected with an exhaust elbow by a retaining ring means, the exhaust elbow including at its outer arc a cylindrical stub pointing substantially in the axial direction of the inner pipe line.

14. An exhaust gas line according to claim 13, wherein the exhaust elbow is supported at the cylindrical stub by a support means.

15. An exhaust gas line according to claim 13, wherein the exhaust elbow is being received at its end located in the flow direction by a radially moving centering ring means.

16. An exhaust gas line according to claim 1, wherein the lug means forming the loose point is provided within the area of its abutment at the edge of the opening of the housing means with an elongated aperture extending in the longitudinal direction, through which extends a bolt secured at the edge.

17. An exhaust gas line according to claim 16, with several inner pipe lines, the retaining ring means of the inner pipe lines being arranged at each of the connecting places of the pipe sections substantially in a single plane and fixedly connected with each other.

18. An exhaust gas line according to claim 17, wherein each connection of several retaining ring means includes two lug means cooperating with the edge of the opening of the housing means.

* * * * *